(12) United States Patent
Mynott et al.

(10) Patent No.: US 7,572,063 B2
(45) Date of Patent: Aug. 11, 2009

(54) OPTO-ELECTRIC CONNECTOR

(75) Inventors: Geoffrey Neil Mynott, Suffolk (GB); Christopher M. Warnes, Suffolk (GB); Graham Woolmer, Hertfordshire (GB)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/224,582

(22) Filed: Sep. 12, 2005

(65) Prior Publication Data
US 2007/0058907 A1    Mar. 15, 2007

(51) Int. Cl.
*G02B 6/38* (2006.01)
*G02B 6/36* (2006.01)

(52) U.S. Cl. .................... 385/56; 385/61; 385/65; 385/79

(58) Field of Classification Search ............. 385/54–56, 385/58–61, 65, 76–79, 92–94
See application file for complete search history.

(56) References Cited

U.S. PATENT DOCUMENTS

| | | | | |
|---|---|---|---|---|
| 4,088,390 A | * | 5/1978 | McCartney | 385/62 |
| 4,140,367 A | * | 2/1979 | Makuch et al. | 385/59 |
| 4,411,491 A | * | 10/1983 | Larkin et al. | 385/73 |
| 4,451,115 A | * | 5/1984 | Nicia et al. | 385/74 |
| 4,496,213 A | * | 1/1985 | Borsuk | 385/75 |
| 4,614,401 A | * | 9/1986 | Strait, Jr. | 385/64 |
| H000280 H | * | 6/1987 | Thigpen | 429/7 |
| 4,678,264 A | | 7/1987 | Bowen et al. | 350/96.2 |
| 4,781,431 A | * | 11/1988 | Wesson et al. | 385/79 |
| 4,854,664 A | * | 8/1989 | McCartney | 385/59 |
| 5,150,442 A | | 9/1992 | Desmons | 385/101 |
| 5,247,595 A | | 9/1993 | Foldi | 385/78 |
| 5,265,182 A | * | 11/1993 | Hartley | 385/77 |
| 5,283,848 A | * | 2/1994 | Abendschein et al. | 385/59 |
| 5,473,715 A | | 12/1995 | Schofield et al. | 385/53 |
| 5,896,477 A | * | 4/1999 | Stephenson et al. | 385/53 |
| 6,196,733 B1 | * | 3/2001 | Wild | 385/86 |
| 6,234,683 B1 | | 5/2001 | Waldron et al. | 385/78 |
| 6,443,626 B1 | * | 9/2002 | Foster | 385/56 |
| 6,497,516 B1 | * | 12/2002 | Toyooka et al. | 385/78 |
| 6,518,506 B2 | * | 2/2003 | Zink et al. | 174/138 R |
| 6,702,475 B1 | * | 3/2004 | Giobbio et al. | 385/53 |

(Continued)

OTHER PUBLICATIONS

Fibreco Limited, "Hybrid Expanded Beam System." May 2005.*

(Continued)

*Primary Examiner*—Uyen Chau N Le
*Assistant Examiner*—Rhonda S Peace
(74) *Attorney, Agent, or Firm*—Karl D. Kovach

(57) ABSTRACT

The device includes a housing, an insert, a first ferrule, a second ferrule, a first ball lens, a second ball lens, a first contact pin, a second contact pin, a first contact socket, a second contact socket, an alignment pin, and an alignment socket. The housing has a first key and a second key. The insert is mounted in the housing. The first ferrule is mounted in the insert. The second ferrule is mounted in the insert. The first ball lens is mounted in the insert, and the first ball lens is in optical communication with the first ferrule. The second ball lens is mounted in the insert, and the first ball lens is in optical communication with the second ferrule. The first and second contact pins, and the first and second contact sockets are mounted in the insert.

14 Claims, 7 Drawing Sheets

U.S. PATENT DOCUMENTS

| | | | |
|---|---|---|---|
| 6,709,284 B1* | 3/2004 | Avlonitis | 439/457 |
| 7,052,185 B2* | 5/2006 | Rubino et al. | 385/58 |
| 7,213,975 B2 | 5/2007 | Khemakhem et al. | 385/75 |
| 7,427,165 B2 | 9/2008 | Benaron et al. | 385/75 |
| 2002/0076164 A1* | 6/2002 | Childers et al. | 385/76 |
| 2002/0097964 A1* | 7/2002 | Roehrs et al. | 385/59 |
| 2002/0181890 A1* | 12/2002 | Perko et al. | 385/78 |
| 2002/0197018 A1* | 12/2002 | Lampert | 385/76 |
| 2003/0147596 A1* | 8/2003 | Lancelle | 385/73 |
| 2003/0223703 A1* | 12/2003 | Chen et al. | 385/78 |
| 2003/0235379 A1 | 12/2003 | Lin | 385/101 |
| 2004/0028342 A1* | 2/2004 | Jones et al. | 385/56 |
| 2004/0091214 A1* | 5/2004 | Finona | 385/76 |
| 2004/0166716 A1* | 8/2004 | Oreglio et al. | 439/352 |
| 2004/0218873 A1 | 11/2004 | Nagashima et al. | 385/75 |
| 2006/0056771 A1* | 3/2006 | Dent | 385/55 |
| 2006/0257076 A1* | 11/2006 | Seeley | 385/60 |

OTHER PUBLICATIONS

Lemo USA, Inc., Lemo's SMPTE Connector, all four pages, 2003, Rohnert Park, California, and printed off of a web site at http://www.lemousa.com/pdfs/catalog/USA/smpte_connectors_datasheet.pdf.

* cited by examiner

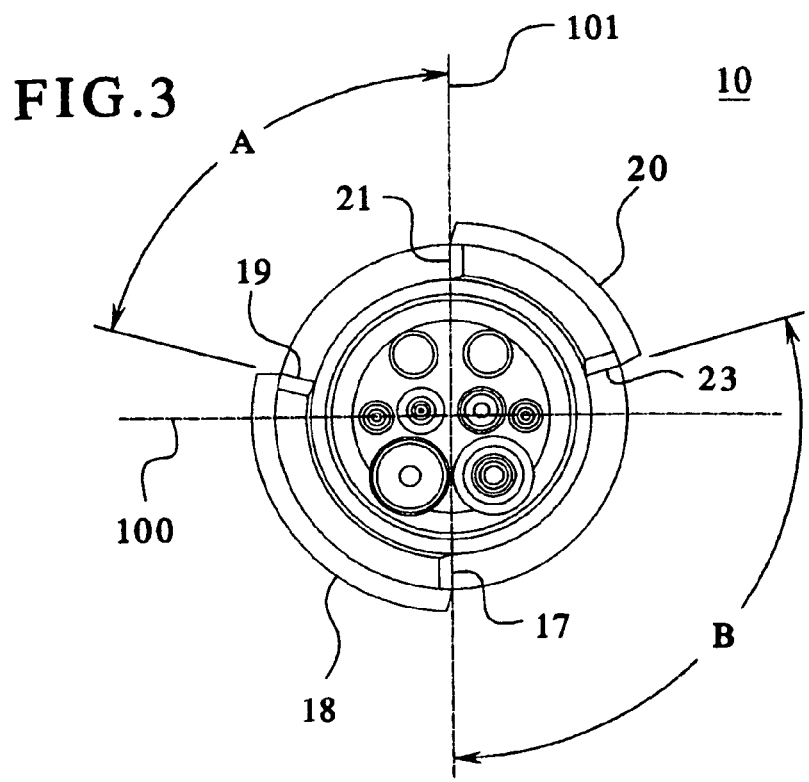
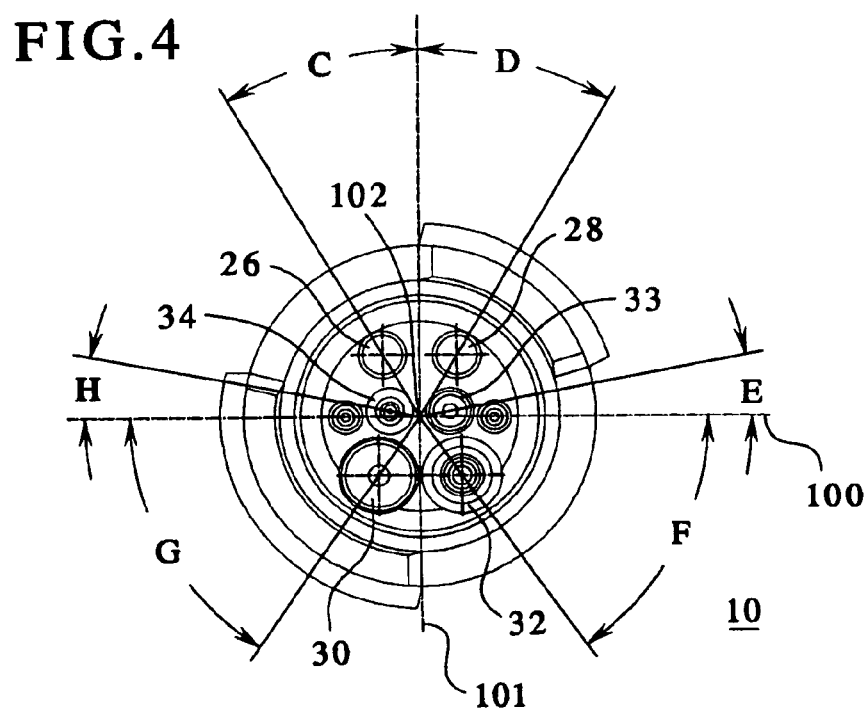

OPTO-ELECTRIC CONNECTOR

BACKGROUND OF THE INVENTION

1. Field of the Invention

The present invention pertains to an opto-electric connector. The invention more particularly concerns an opto-electric connector having expanded light beam capabilities and a hermaphroditic interface.

2. Discussion of the Background

Expanded beam connectors are known in the art. Typically, an expanded beam connector includes a ball lens mounted in a housing. In one direction of light travel, light exits an optical fiber and enters the ball lens. As the light beam exits the ball lens, the cross section of the light beam is expanded several times. The expanded beam of light can then be associated with another expanded beam connector. In such a scenario, the expanded light beam enters a ball lens where it eventually leaves the ball lens and is focused at a particular location. The focused light then enters an optical fiber.

The use of expanded beam technology allows for some misalignment between the two connectors, and it also accommodates, to some degree, the intrusion of debris such as dust or sand. When debris is deposited between the two ball lenses, the debris blocks some of the optical power of the optical signal from reaching the second ball lens. However, the optical signal is successfully transmitted, albeit at a reduced optical power level. If a non-expanded beam connector was employed, the debris would have probably blocked the transmission of the optical signal in its entirety. An expanded beam connector is disclosed in U.S. Pat. No. 5,247,595. U.S. Pat. No. 5,247,595 is hereby incorporated herein by reference.

Opto-electric connectors are known in the art. An opto-electric connector provides for the transmission of both electrical signals and optical signals. A standard, ANSI/SMPTE 304M-1998 (where SMPTE stands for Society of Motion Picture and Television Engineers), describes a connector's interface and performance requirements for an opto-electric single mode connector solution for use within the broadcast industry that employs butt joint (non-expanded beam) technology.

Hermaphroditic connectors are known in the art. Hermaphroditic connectors ease inventory concerns, and provide easy field coupling since the ends of the two connectors will always mate. U.S. Pat. No. 6,234,683 discloses a fiber optic hermaphroditic connector. Optical transmission of the optical signal disclosed in U.S. Pat. No. 6,234,683 occurs by way of a butt joint when the connector is mated with another connector. U.S. Pat. No. 6,234,683 is hereby incorporated herein by reference.

It is desirable to provide a connector that incorporates the advantageous features of the different types of connectors.

SUMMARY OF THE INVENTION

It is an object of the invention to provide a device which has both optical and electrical connection features.

It is another object of the invention to provide a device which is hermaphroditic so that the device can attach to another device thus enabling the transmission of optical and electrical signals.

It is still yet another object of the invention to provide a device which employs expanded beam technology so that, when two devices are connected to each other, they enable the transmission of optical signals in harsh environments.

It is still another object of the invention to provide a device is easy to terminate in the field.

It is yet another object of the invention to provide a device is able to act as a temporary patch cord.

It is another object of the invention to provide a device is mountable to a bulkhead.

In one form of the invention the device is an opto-electric connector which includes a housing, an insert, a first ferrule, a second ferrule, a first ball lens, a second ball lens, a first contact pin, a second contact pin, a first contact socket, a second contact socket, an alignment pin, and an alignment socket. The housing has a first key and a second key. The insert is mounted in the housing. The first ferrule is mounted in the insert. The second ferrule is mounted in the insert. The first ball lens is mounted in the insert, and the first ball lens is in optical communication with the first ferrule. The second ball lens is mounted in the insert, and the first ball lens is in optical communication with the second ferrule. The first contact pin is mounted in the insert. The second contact pin is mounted in the insert. The first contact socket is mounted in the insert. The second contact socket is mounted in the insert. The alignment pin is mounted in the insert. The alignment socket is formed in the insert. The first key, the second key, the first ball lens, the second ball lens, the first contact pin, the first contact socket, the second contact pin, the second contact socket, the alignment pin, and the alignment socket are hermaphroditic with a first key, a second key, a first ball lens, a second ball lens, a first contact pin, a first contact socket, a second contact pin, a second contact socket, an alignment pin, and an alignment socket of another device. Additionally, the first ferrule has an end which is at an angle relative to a longitudinal length direction of the first ferrule, and the second ferrule has an end which is at an angle relative to a longitudinal direction of the second ferrule.

In another form of the invention, the device is a field installable opto-electric connector which includes a housing, an insert, a fiber optic connector, a second fiber optic connector, a contact pin, a second contact pin, a third contact pin, a fourth contact pin, and a cover. The first fiber optic connector is mounted in the insert. The second fiber optic connector is mounted in the insert. The first and second fiber optic connectors conform to the LC standard. The first contact pin is mounted in the insert. The second contact pin is mounted in the insert. The third contact pin is mounted in the insert. The fourth contact pin is mounted in the insert. The first, second, third, and fourth contact pins provide for electrical connections. The cover is attached to the housing, the cover has a key, and the cover is a male cover.

In still yet another form of the invention, the device is an opto-electric patch cord which includes a first housing, a first insert, a first ferrule, a second ferrule, a first ball lens, a second ball lens, a contact pin, a second contact pin, a first contact socket, a second contact socket, an alignment pin, and alignment socket, a second housing, a second insert, a first fiber optic connector, a second fiber optic connector, a third contact pin, a fourth contact pin, a fifth contact pin, a sixth contact pin, a cover, a first optical fiber, a second optical fiber, a first conductor, a second conductor, a third conductor, and a fourth conductor. The first housing has a first key, and a second key. The first insert is mounted in the first housing. The first ferrule is mounted in the first insert. The first ferrule having an end which is at an angle relative to a longitudinal length direction of the first ferrule. The second ferrule is mounted in the first insert. The second ferrule having an end which is at an angle relative to a longitudinal length direction of the second ferrule. The first ball lens is mounted in the first insert, and the first ball lens is in optical communication with the first ferrule. The second ball lens is mounted in the second insert, and the second ball lens is in optical communication with the second ferrule. The first contact pin is mounted in the first insert. The second contact pin is mounted in the first insert. The first contact socket is mounted in the first insert. The second contact socket is mounted in the first insert. The alignment pin is mounted in the first insert. The alignment pin socket is formed in the insert. The first key, the second key, the first ball lens, the second ball lens, the first contact pin, the first contact socket, the second contact pin, the second contact socket, the alignment pin, and the alignment socket are hermaphroditic with a first key, a second key, a first ball lens, a second ball lens, a first contact pin, a first contact socket, a second contact pin, a second contact socket, an alignment pin, and an alignment socket of another device. The second insert is mounted in the second housing. The first fiber optic connector mounted in the second insert. The second fiber optic connector mounted in the second insert. The third contact pin mounted in the second insert. The third contact pin mounted in the second insert. The fourth contact pin mounted in the second insert. The fifth contact pin mounted in the second insert. The sixth contact pin mounted in the second insert. The cover is attached to the second housing, and the cover has a third key. The first optical fiber is attached to the first ferrule and to the first fiber optic connector so that the first ferrule is in optical communication with the first fiber optic connector. The second optical fiber is attached to the second ferrule and to the second fiber optic connector so that the second ferrule is in optical communication with the second fiber optic connector. The first conductor is attached to the first contact pin and to the third contact pin so that the first contact pin is in electrical communication with the third contact pin. The second conductor is attached to the first contact socket and to the fourth contact pin so that the first contact socket is in electrical communication with the fourth contact pin. The third conductor is attached to the second contact pin and to the fifth contact pin so that the second contact pin is in electrical communication with the fifth contact pin. The fourth conductor is attached to the second contact socket and to the sixth contact pin so that the second contact socket is in electrical communication with the sixth contact pin.

In yet another form of the invention, the device is an opto-electric patch cord having similar connectors on each end, the device includes a first housing, a first insert, a first fiber optic connector, a second fiber optic connector, a first contact pin, a second contact pin, a third contact pin, a fourth contact pin, a first cover, a second housing, a second insert, a third fiber optic connector, a fourth fiber optic connector, a fifth contact pin, a sixth contact pin, a seventh contact pin, an eighth contact pin, a second cover, a first optical fiber, a second optical fiber, a first conductor, a second conductor, a third conductor, and a fourth conductor. The first housing is mounted in the first insert. The first fiber optic connector is mounted in the first insert. The second fiber optic connector is mounted in the first insert. The first contact pin is mounted in the first insert. The second contact pin is mounted in the first insert. The third contact pin is mounted in the first insert. The fourth contact pin is mounted in the first insert. The first cover is attached to the first housing, and the first cover has a first key. The second insert is mounted in the second housing. The third fiber optic connector mounted in the second insert. The fourth fiber optic connector mounted in the insert. The fifth contact pin mounted in the second insert. The sixth contact pin mounted in the second insert. The seventh contact pin mounted in the second insert. The eighth contact pin mounted in the second insert. The second cover is attached to the second housing, and the second cover has a second key. The first optical fiber is attached to the first fiber optic connector and to the third fiber optic connector so that the first fiber optic connector is in optical communication with the third fiber optic connector. The second optical fiber is attached to the second fiber optic connector and to the fourth fiber optic connector so that the second fiber optic connector is in optical communication with the fourth fiber optic connector. The first conductor is attached to the first contact pin and to the fifth contact pin so that the first contact pin is in electrical communication with the fifth contact pin. The second conductor is attached to the second contact pin and to the sixth contact pin so that the second contact pin is in electrical communication with the sixth contact pin. The third conductor is attached to the third contact pin and to the seventh contact pin so that the third contact pin is in electrical communication with the seventh contact pin. The fourth conductor is attached to the fourth contact pin and to the eighth contact pin so that the fourth contact pin is in electrical communication with the eighth contact pin. Additionally, the first cover is a male cover, and the second cover is a male cover.

Thus, the invention achieves the objectives set forth above. The invention provides a device which, in one embodiment, is an opto-electric connector, in a second embodiment, is a field repairable opto-electric connector, in a third embodiment, is an opto-electric patch cord having two geometrically different connectors, and in a fourth embodiment, is an opto-electric connector having two identical connectors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is the partial end view of the connector of FIG. 2 showing the geometry of the keys of the housing;

FIG. 4 is the partial end view of the connector of FIG. 2 showing the layout of the interface elements;

DETAILED DESCRIPTION OF THE PRESENTLY PREFERRED EMBODIMENTS

Figure 1:
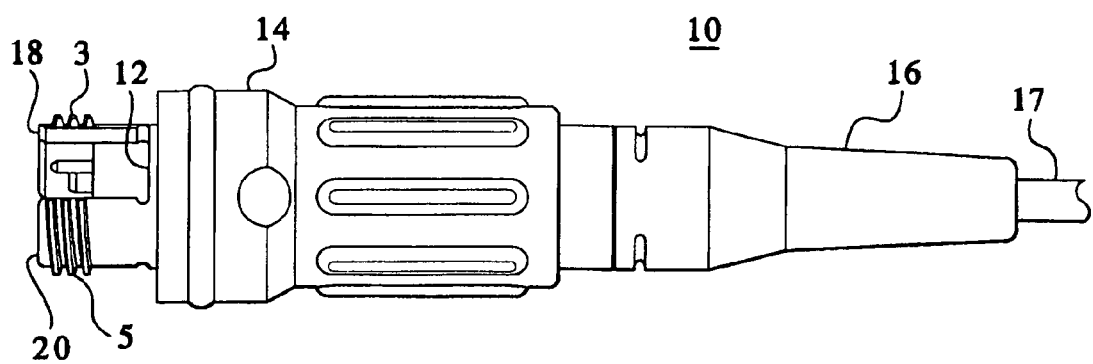
FIG. 1 is a side view of an opto-electric connector.

Referring now to the drawings, wherein like reference numerals designate identical or corresponding parts throughout the several views, and more particularly to FIGS. 1-13 thereof, embodiments of the present invention is displayed therein.

FIG. 1 is a side view of the opto-electric connector or device 10 which is a first embodiment of the invention. The opto-electric connector 10 includes a housing 12, a shell 14, a strain relief boot 16, and a cable 17. The housing 12 includes a first key 18, and a second key 20. The first key 18 includes a thread form 3, and the second key 20 includes a thread form 5. The cable 17 includes two optical fibers and four electrical conductors.

Figure 2:
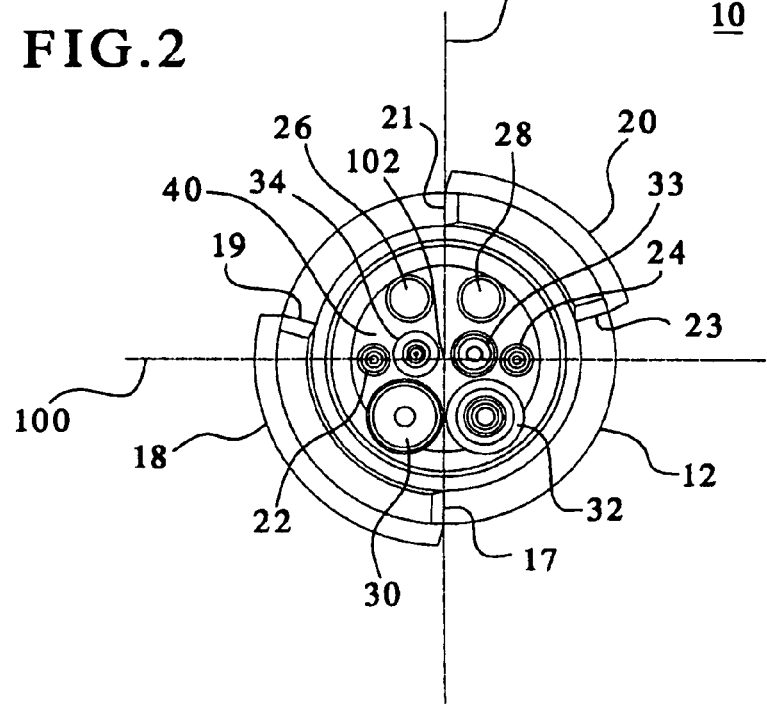
FIG. 2 is a partial end view of the connector of FIG. 1 showing the interface elements.

FIG. 2 is a partial end view of the device 10 of FIG. 1. As shown in FIG. 2, the device 10 further includes an insert 40. The insert 40 houses an alignment pin 22, an alignment pin socket 24, a first fiber optic connector 26, a second fiber optic connector 28, an auxiliary electrical contact socket 30, an auxiliary electrical contact pin 32, a low voltage contact socket 33, and a low voltage contact pin 34. The first fiber optic connector 26 and the second fiber optic connector 28 transmit and/or receive light signals. The low voltage contact socket 33 and the low voltage contact pin 34 conduct electricity utilized with transmitting information signals. The auxiliary electrical contact socket 30 and the auxiliary electrical contact pin 32 conduct electricity utilized with power components. Optical fibers associated with the first fiber optic connector 26 and the second fiber optic connector 28 can be either multi-mode or single mode optical fibers.

FIG. 2 also discloses more features of the first key 18 and the second key 20 of the housing 12. The first key 18 has one end 17 and another end 19. The second key 20 has one end 21 and another end 23. Also defined is a line 100 which lies on the center points of the alignment pin 22 and the alignment pin socket 24. A line 101 is defined as intersecting line 100 at a right angle and is positioned equal distant between the alignment pin 22 and the alignment pin socket 24. The intersection of line 100 and line 101 is defined as point 102. The alignment pin 22 and the alignment pin socket 24 lie on line 100 and are located at a pitch circle diameter of approximately ten millimeters with the center located at point 102. Thus the alignment pin 22 is approximately five millimeters away from the point 102, and the alignment socket 24 is approximately five millimeters away from the point 102.

FIG. 3 is the partial end view of the device 10 of FIG. 2 showing the geometry of the first key 18 and the second key 20 of the housing 12. The one end 21 of the second key 20 is separated from the one end 19 of the first key 18 by an arc length A which is substantially equal to seventy-five degrees. The other end 23 of the second key 20 is separated from the other end 17 of the first key 18 by an arc length B which is substantially equal to one-hundred-six degrees. The end 17 of the first key 18 and the end 21 of the second key 20 substantially lie along or are parallel to line 101.

FIG. 4 is the partial end view of the device 10 of FIG. 2 showing the layout of the interface elements. The first fiber optic connector 26 is separated from line 101 by an arc length C which is substantially equal to thirty degrees. The second fiber optic connector 28 is separated from line 101 by an arc length D which is substantially equal to thirty degrees. The first fiber optic connector 26 and the second fiber optic connector 28 are located at a pitch circle diameter of approximately ten millimeters with the center located at point 102. Thus the first fiber optic connector 26 is approximately five millimeters away from the point 102, and the second fiber optic connector 28 is approximately five millimeters away from the point 102. The low voltage contact pin 34 is separated from line 100 by an arc length H which is substantially equal to ten degrees. The low voltage contact pin socket 33 is separated from line 100 by an arc length E which is substantially equal to ten degrees. The low voltage contact pin 34 and the low voltage contact pin socket 33 are located at a pitch circle diameter of four and one-fifths millimeters with the center located at point 102. Thus the low voltage contact pin 34 is approximately two and one-tenth millimeters away from the point 102, and the low voltage contact pin socket 33 is approximately two and one-tenth millimeters away from the point 102. The auxiliary electrical contact socket 30 is separated from line 100 by an arc length G which is substantially equal to fifty-five degrees. The auxiliary electrical contact pin 32 is separated from line 100 by an arc length F which is substantially equal to fifty-five degrees. The auxiliary electrical contact pin 32 and the auxiliary electrical contact pin socket 30 are located at a pitch circle diameter of ten millimeters with the center located at point 102. Thus the auxiliary electrical contact pin 32 is approximately five millimeters away from the point 102, and the auxiliary contact pin socket 30 is approximately five millimeters away from the point 102.

Figure 5:
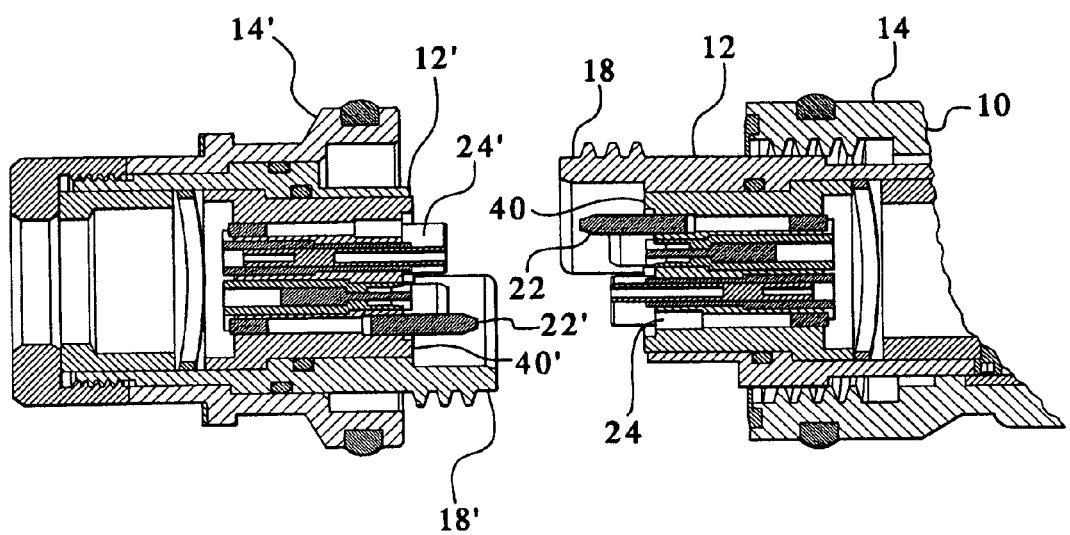
FIG. 5 is a cross-sectional side view of the connector of FIG. 1 and of a bulkhead mountable connector showing the alignment pin and the alignment socket.

FIG. 5 is a partial cross-sectional side view of the connector 10 and a bulkhead mountable connector which has the hermaphroditic features of the connector 10. The cross-section displays the alignment pin 22 and the alignment pin socket 24. The housing 12 is mounted in the shell 14. The insert 40 is mounted in the housing 12. The alignment pin 22 is mounted in the insert 40. The alignment pin socket 24 is formed in the insert. The bulkhead mountable connector includes a shell 14', a housing 12', an insert 40', an alignment pin 22', and an alignment pin socket 24'. The alignment pin socket 24' is complimentary to the alignment pin 22, and the alignment pin 22' is complimentary to the alignment pin socket 24. The alignment pin 22 may be mounted in the insert 40 by well known methods such as a press, interference, or friction fit, or use of an adhesive, overmolding, snap rings, or other fastening methods. Likewise, the insert 40 is mounted in the housing 12 by way of components and methods known to one skilled in the art. To make the connector 10 more reliable in the field, O-rings are present between the insert 40 and the housing 12, and the on the shell 14. Also, plugs are present in the insert 40 at the alignment pin socket 24 and below the alignment pin 22 so as to prevent external environmental matter from being introduced inside the connector 10.

Figure 6:
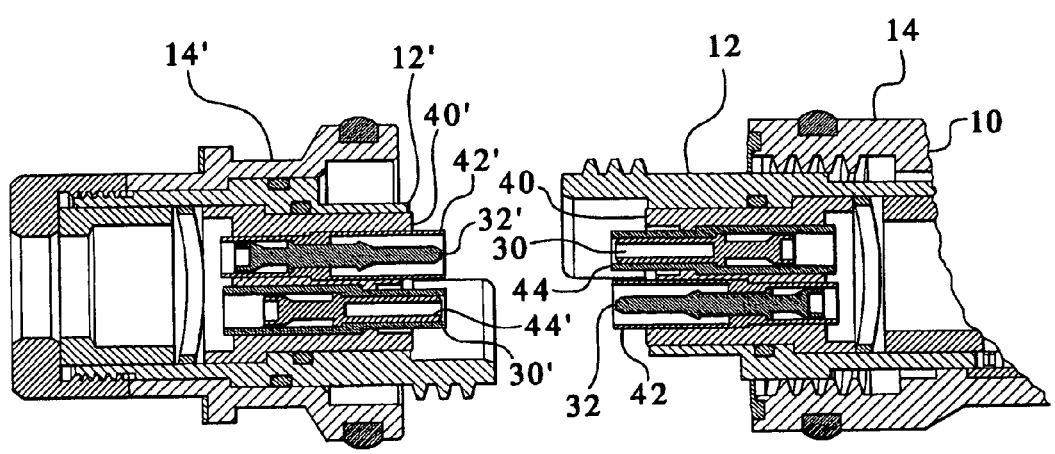
FIG. 6 is a cross-sectional side view of the connector of FIG. 1 and of the bulkhead mountable connector showing the auxiliary electrical contact pin and the auxiliary electrical contact socket.

FIG. 6 is a partial cross-sectional side view of the connector 10 and a bulkhead mountable connector which has the hermaphroditic features of the connector 10. The cross-section displays the auxiliary electrical contact pin socket 30 and the auxiliary electrical contact pin 32. The auxiliary electrical contact pin socket 30 is mounted in a socket holder 44. The socket holder 44 is mounted in the insert 40. The auxiliary electrical contact pin 32 is mounted in a pin holder 42. The pin holder 42 is mounted in the insert 40. The bulkhead has an auxiliary electrical contact pin 32' that is complimentary to the auxiliary electrical contact pin socket 30, and an auxiliary electrical contact pin socket 30' that is complimentary to the auxiliary electrical contact pin 32. The mounting of the auxiliary electrical contact pin 32 in pin holder 42, the auxiliary electrical contact pin socket 30 in the socket holder 44, the pin holder 42 in the insert 40, and the socket holder 44 in the insert 40 are accomplished by components and methods known to one skilled in the art. The auxiliary electrical contact pin socket 30, and the auxiliary electrical contact pin 32 are made of electrically conductive material. A first conductor which is electrically conductive is electrically associated with the auxiliary electrical contact pin socket 30. A second conductor which is electrically conductive is electrically associated with the auxiliary electrical contact pin 32.

Figure 7:
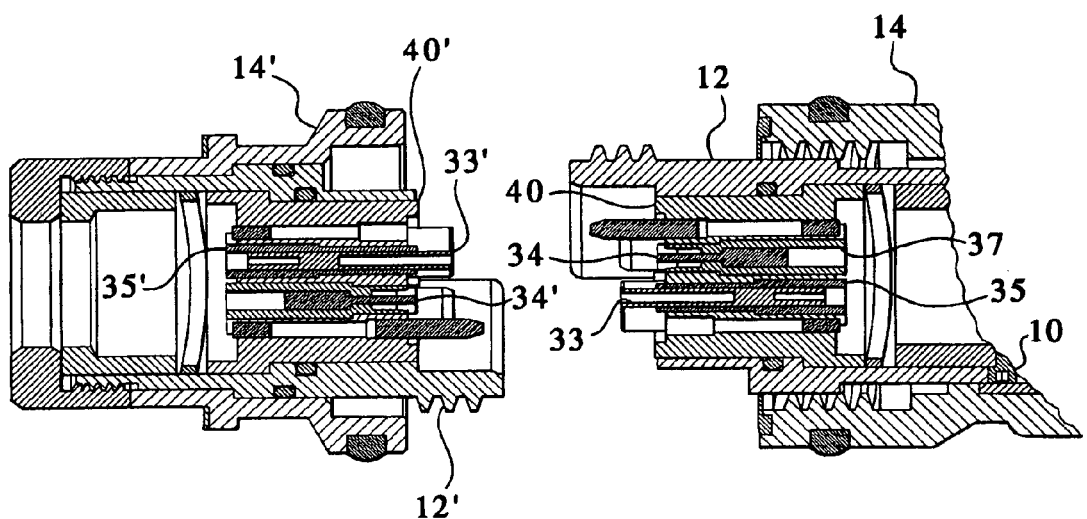
FIG. 7 is a cross-sectional side view of the connector of FIG. 1 and of the bulkhead mountable connector showing the low voltage contact pin and the low voltage contact socket.

FIG. 7 is a partial cross-sectional side view of the connector 10 and a bulkhead mountable connector which has the hermaphroditic features of the connector 10. The cross-section displays the low voltage contact pin socket 33 and the low voltage contact pin 34. The low voltage contact pin socket 33 is mounted in a socket holder 35. The socket holder 35 is mounted in the insert 40. The low voltage contact pin 34 is mounted in a pin holder 37. The pin holder 37 is mounted in the insert 40. The bulkhead connector has a low voltage contact pin socket 33' which is complimentary to the low voltage contact pin 34, and a low voltage contact pin 34' which is complimentary to the low voltage contact pin socket 33. The mounting of the low voltage contact pin 34 in pin holder 37, the auxiliary electrical contact pin socket 33 in the socket holder 35, the pin holder 37 in the insert 40, and the socket holder 35 in the insert 40 are accomplished by components and methods known to one skilled in the art. A third conductor which is electrically conductive is electrically associated with the low voltage contact pin socket 33. A fourth conductor which is electrically conductive is electrically associated with the low voltage contact pin 34.

Figure 8:
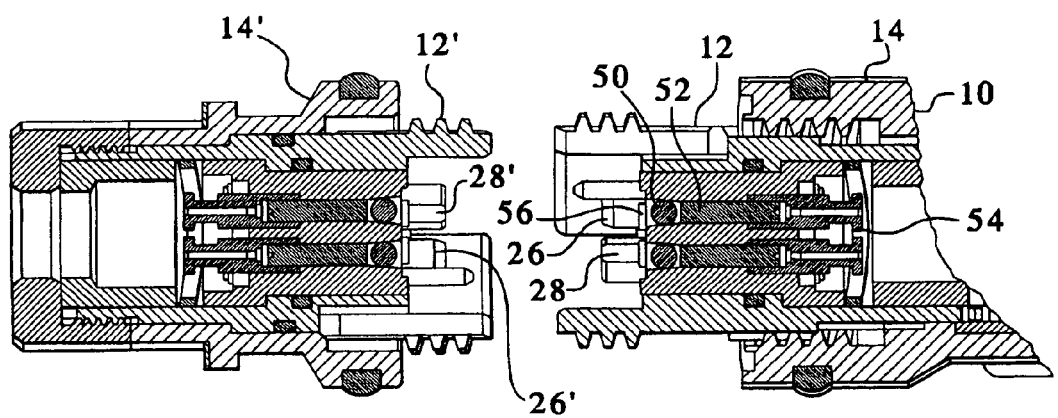
FIG. 8 is a cross-sectional side view of the connector of FIG. 1 and of the bulkhead mountable connector showing the two fiber optic connectors.

FIG. 8 is a partial cross-sectional side view of the connector 10 and a bulkhead mountable connector which has the hermaphroditic features of the connector 10. The cross-section displays the first optical connector 26 and the second optical connector 28. The first optical connector 26 includes a ferrule 52, a ferrule holder 54, a ball lens 50, and a transparent cover 56. The second optical connector 28 includes a ferrule, ferrule holder, ball lens, and a transparent cover. The bulkhead connector includes an optical connector 28' which is complementary to the first optical connector 26, and another optical connector 26' which complementary to the second optical connector 28. The ferrule 52 is mounted in the ferrule holder 54. The ferrule holder 54 is mounted in the insert 40. The ball lens 50 is mounted in the insert 40. The transparent cover 56 is mounted to the insert 40. The second optical connector 28 is constructed similarly. An optical fiber is terminated in the ferrule 52 of the first optical connector 26 and another optical fiber is terminated in the ferrule of the second optical fiber 28. Thus, the ball lens 50 is in optical communication with the ferrule 52, and, hence, the ball lens 50 is in optical communication with the optical fiber. In turn, the transparent cover 56 is in optical communication with the ball lens 50. The elements of the second optical connector 28 are similarly associated with one another. The mounting of the ferrule 52 in the ferrule holder 54, and of the ferrule holder 54, the ball lens 50, and the transparent cover 56 of the first optical connector 26 in or on the insert 40, and of the ferrule holder, the ball lens, and the transparent cover of the second optical connector 28 in or on the insert 40 are accomplished by components and methods known to one skilled in the art. The ferrule 52 can have its end nearest the ball lens 50 formed at an angle relative to a longitudinal direction of the ferrule 52 so as to reduce back reflection.

The shell 14, the housing 12, the insert 40, the ferrule 54, the ferrule holder 54, the low voltage contact pin 34, the pin holder 37, the low voltage contact pin socket 33, the socket holder 35, the auxiliary electrical contact pin 32, the pin holder 42, the auxiliary electrical contact pin socket 30, the socket holder 44, and the alignment pin 22 are made of suitable engineering materials. Typically the housing 12 is made of a metallic material, and the insert 40 is made of a metallic material such as ARCAP. Since the insert 40 is made of a metallic material, the pin holder 37, the socket holder 35, the pin holder 42, and the socket holder 44 are made of an insulative material. However, if the insert 40 is made of an insulative material, then the pin holder 37, the socket holder 35, the pin holder 42, and the socket holder 44 can be eliminated from the assembly.

Figure 9:
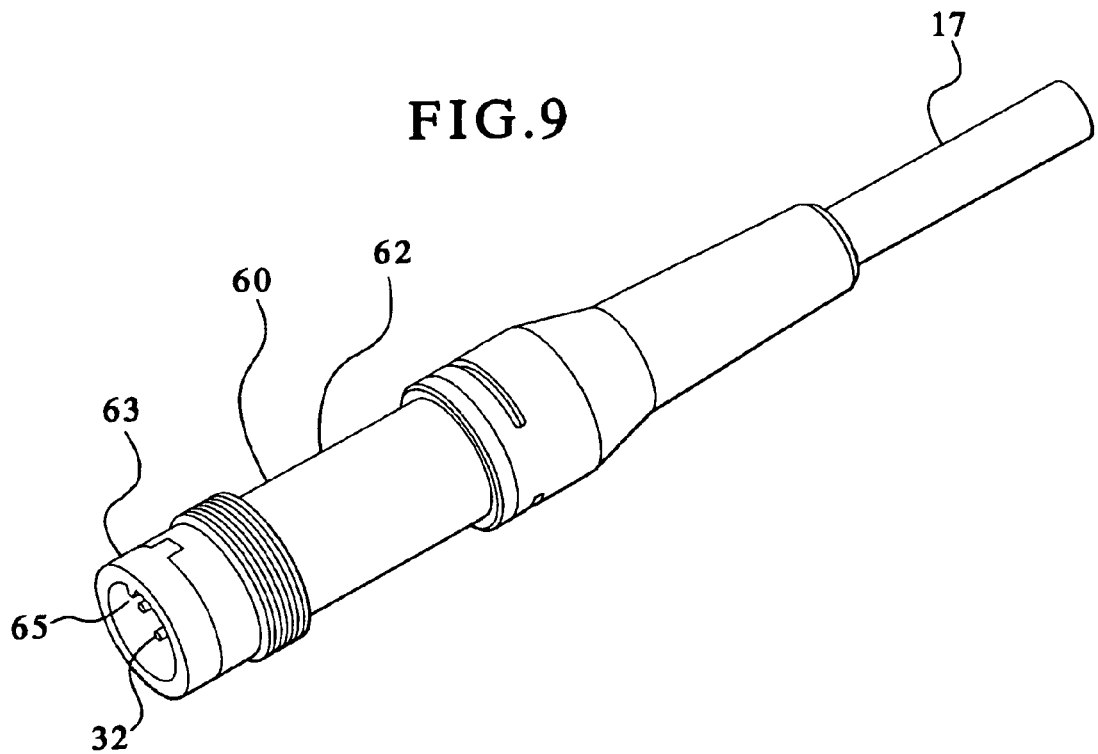
FIG. 9 is a perspective view of an opto-electric connector not having expanded beam capabilities which is used in the field to temporarily repair an expanded beam opto-electric connector.
Figure 10:
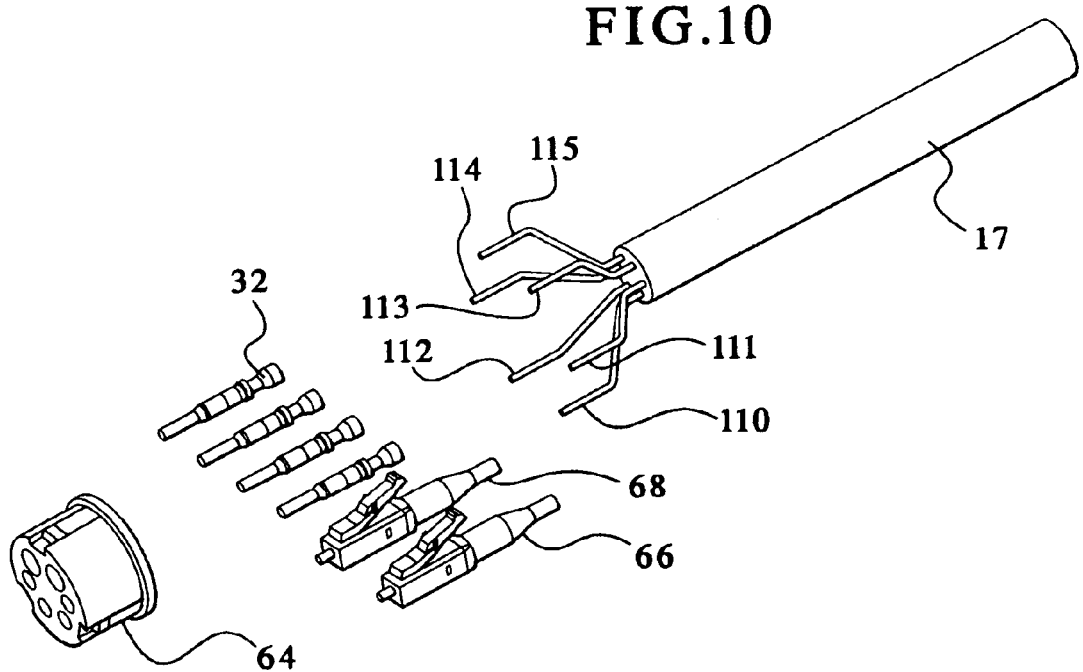
FIG. 10 is a partial expanded perspective view of the opto-electric connector of FIG. 9.

A second embodiment of the invention is shown in FIGS. 9 and 10. FIG. 9 is a perspective view of an opto-electric connector 60 not having expanded beam capabilities. The connector 60 includes a housing 62, a cover 63, and a key 65 in the cover 63. Field repairs of an expanded beam connector, similar to the connector 10 shown in FIG. 1, are difficult to perform. So, assuming a connector similar to the connector 10 shown in FIG. 1 fails, then the cable 17 can be cut so as to expose the two optical fibers and the four conductors.

FIG. 10 is a partial exploded view of the connector 60 of FIG. 9. Disclosed are the cable 17, termination elements 32, 66, 68, and an insert 64. The cable 17 includes a first optical fiber 110, a second optical fiber 111, a first conductor 112, a second conductor 113, a third conductor 114, and a forth conductor 115. The cable 17 is thread through the housing 62. Then the first optical fiber 110 is terminated in a first optical connector 66, the second optical fiber 111 is terminated in the second optical connector 68, the first conductor 112 is terminated in the first contact pin 32, and the remaining three conductors 113, 114, 115, are terminated in the respective remaining three contact pins. The first optical connector 66, and the second optical connector 68 conform to the LC standard. Next, the contact pins 32, the first optical connector 66, and the second optical connector 68 are mounted into the insert 64. Then the cover 63 is added to the assembly so that the finish device appears as shown in FIG. 9. The insert 64 is made of an insulative material. The device 60 can then be connected to a temporary patch cord as will be described next.

Figure 11:
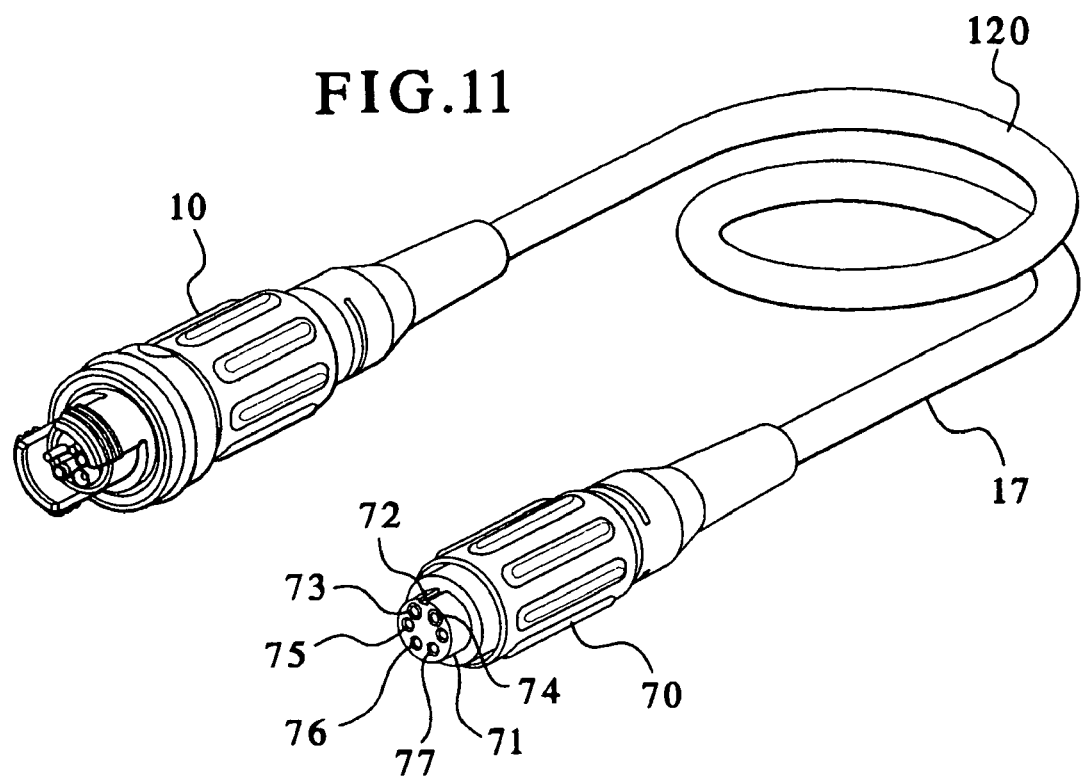
FIG. 11 is a perspective view of an opto-electric patch cord where one end of the cord has an expanded beam connector and the other end of the cord has a non-expanded beam connector.

A third embodiment of the invention is shown in FIG. 11. FIG. 11 is a perspective view of an opto-electric patch cord 120 having an expanded beam connector 10 at one end and a non-expanded beam connector 70 at the other end. The connector 10 is as described in regard to FIG. 1. The connector 70 includes a first electrical contact socket 75, a second electrical contact socket 76, a third electrical contact socket 77, a fourth electrical contact socket 75, a first fiber optic socket 73, and a second fiber optic socket 74. The cover 71 includes a key 72. The connector 70 is complimentary to the connector 60 shown in FIG. 9. Thus, once the cable has been terminated with the field installed connector 60, the patch cord 120 is used to attach its connector 70 to the connector 60. Now the expanded beam connector 10 can be used to connect to other devices until the cable 17 of FIG. 10 is properly terminated. The two optical connectors at the interface nearest connector 70 are connected to the two optical connectors associated with the connector 10 by lengths of respective optical fibers. Likewise, the four electrically conductive members associated with the connector 70 are connected to the four electrically conductive members associated with connector 10 by lengths of respective conductors.

Figure 12:
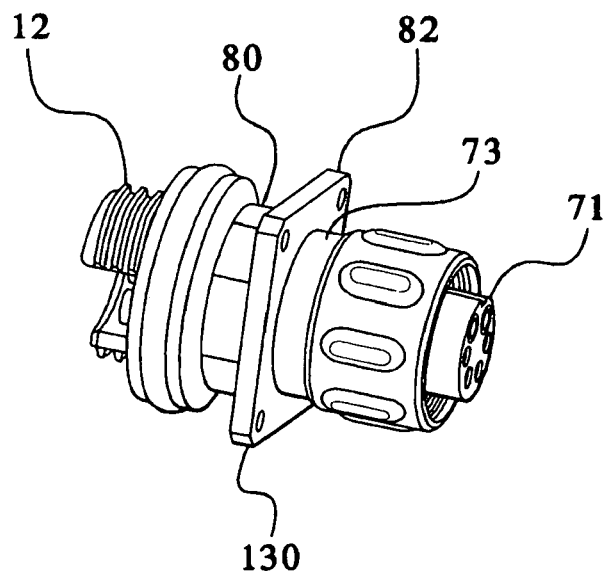
FIG. 12 is a perspective view of a bulkhead mountable opto-electric connector.

A fourth embodiment of the invention is shown in FIG. 12. FIG. 12 is a perspective view of a bulkhead mountable opto-electric connector 80. As shown, one end of the device 80 includes a interface geometry of connector 10 as shown in FIG. 1, including the housing 12 and insert, and at its other end the device 80 includes a housing 73 and the interface geometry of the cover 71 of FIG. 11. Attached to a housing 73 is a bulkhead plate 82 for mounting to a bulkhead. The two optical connectors at the interface nearest the housing 12 are connected to the two optical connectors associated with the cover 71 by short lengths of respective optical fibers. Likewise, the four electrically conductive members associated with the housing 12 are connected to the four electrically conductive members associated with the cover 71 by short lengths of respective conductors. Thus, one end 12 of the device 80 has expanded beam capabilities, and the other end 71 of the device 80 does not have expanded beam capabilities.

Figure 13:
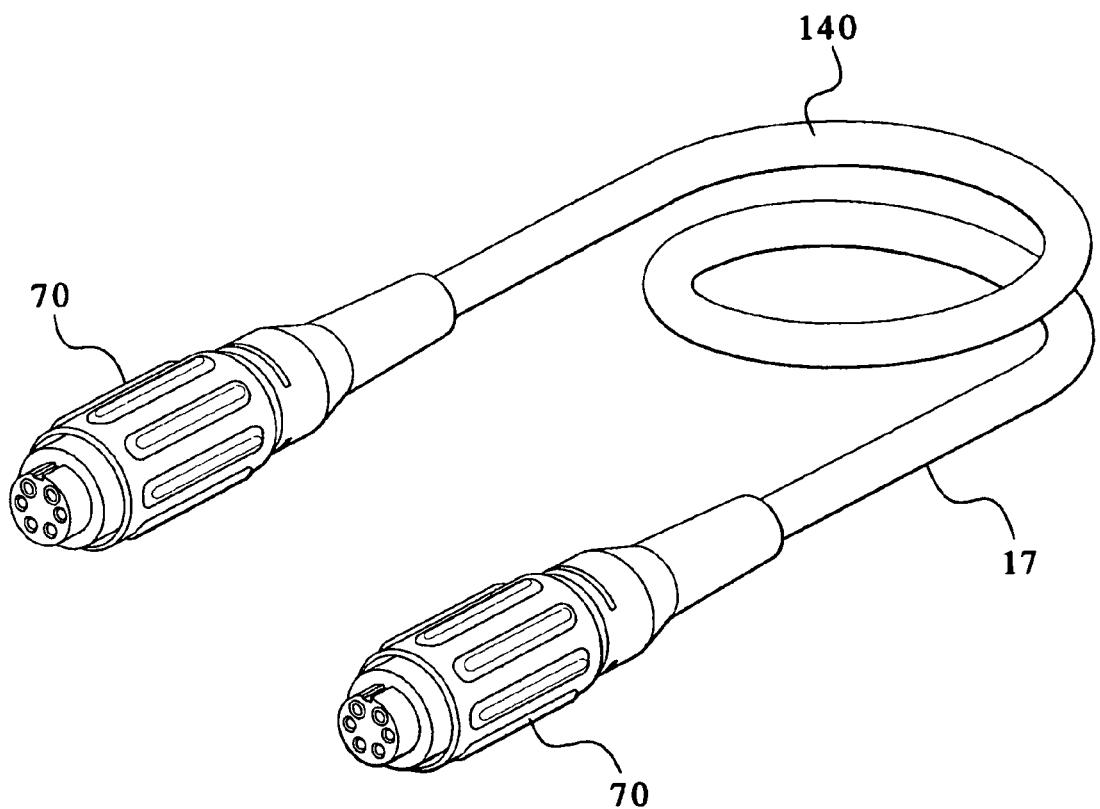
FIG. 13 is a perspective view of an opto-electric patch cord where each end of the cord has the same non-expanded beam connector.

A fifth embodiment of the invention is shown in FIG. 13. FIG. 13 is a perspective view of a patch cord 140. As shown, the device 140 includes a cable 17, at one end of which the device 140 includes a connector 70 that conforms to the design set forth in FIG. 11, and the other end of the device 140 also includes a connector 70. The two optical connectors at the interface nearest the first connector 70 are connected to the two optical connectors associated with the second connector 70 by lengths of respective optical fibers. Likewise, the four electrically conductive members associated with the first connector 70 are connected to the four electrically conductive members associated with the second connector 70 by lengths of respective conductors. The device 140 can be used as midstream temporary patch cord where to different cables having connectors 10 failed in the field.

Thus the interface geometry of the expanded beam connectors provides two optical access locations (26, 28), two electrical signal access locations (33, 34), and two electrical power access locations (30, 32). The performance of the expanded beam connectors meet the performance requirements set forth in ANSI/SMPTE 304M-1998. Therefore, the expanded beam connectors provide an expanded beam replacement solution to the butt joint (non-expanded beam) connectors specified in ANSI/SMPTE 304M-1998.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a housing having a first key and a second key;
   an insert mounted in the housing;
   a first ferrule mounted in the insert;
   a first ball lens mounted in the insert, and the first ball lens is in optical communication with the first ferrule;
   a second ferrule mounted in the insert;
   a second ball lens mounted in the insert, and the second ball lens is in optical communication with the second ferrule;
   a first contact pin mounted in the insert;
   a first contact socket mounted in the insert;
   a second contact pin mounted in the insert;
   a second contact socket mounted in the insert;
   an alignment pin mounted in the insert; and
   an alignment socket formed in the insert, and wherein
   the first key, the second key, the first ball lens, the second ball lens, the first contact pin, the first contact socket, the second contact pin, the second contact socket, the alignment pin, and the alignment socket are hermaphroditic with a first key, a second key, a first ball lens, a second ball lens, a first contact pin, a first contact socket, a second contact pin, a second contact socket, an alignment pin, and an alignment socket of another device, and wherein
   the first ferrule has an end which is at an angle relative to a longitudinal length direction of the first ferrule, and wherein the second ferrule has an end which is at an angle relative to a longitudinal length direction of the second ferrule.

2. A device according to claim 1 wherein the first key has a first end and a second end, and the second key has a third end and fourth end, and the first end of the first key is separated from the third end of the second key by approximately seventy-five degrees, and the second end of the second key is separated from the fourth end of the second key by approximately one-hundred-six degrees.

3. A device according to claim 2 wherein the alignment pin and the alignment socket lie on a first line, and a second line intersects the first line at ninety degrees, and the second line is equal distant from both the alignment pin and the alignment socket, the first contact pin separated from the first line by approximately fifty-five degrees, the first contact socket separated from the first line by approximately fifty-five degrees, the second contact pin separated from the first line by approximately ten, the second contact socket separated from the first line by approximately ten degree, the first ball lens separated from the second line by approximately thirty degrees, and the second ball lens separated from the second line by approximately thirty degrees.

4. A device according to claim 3 wherein the alignment pin is approximately five millimeters away from an intersection of the fist line and the second line, the alignment socket is approximately five millimeters away from the intersection, the first ball lens is approximately five millimeters away from the intersection, the second ball lens is approximately five millimeters away from the intersection, the first contact pin is approximately five millimeters away from the intersection, the first contact socket is approximately five millimeters away from the intersection, the second contact pin is approximately two and one-tenth millimeters away from the intersection, and the second contact socket is approximately two and one tenth millimeters away from the intersection.

5. A device comprising:
   a first housing having a first key and a second key;
   a first insert mounted in the first housing;
   a first ferrule mounted in the first insert; the first ferrule having an end which is at an angle relative to a longitudinal length direction of the first ferrule;
   a first ball lens mounted in the first insert, and the first ball lens is in optical communication with the first ferrule;
   a second ferrule mounted in the first insert; the second ferrule having an end which is at an angle relative to a longitudinal length direction of the second ferrule;
   a second ball lens mounted in the first insert, and the second ball lens is in optical communication with the second ferrule;
   a first contact pin mounted in the first insert;
   a first contact socket mounted in the first insert;
   a second contact pin mounted in the first insert;
   a second contact socket mounted in the first insert;
   an alignment pin mounted in the first insert;
   an alignment socket formed in the first insert, and wherein the first key, the second key, the first ball lens, the second ball lens, the first contact pin, the first contact socket, the second contact pin, the second contact socket, the alignment pin, and the alignment socket are hermaphroditic with a first key, a second key, a first ball lens, a second ball lens, a first contact pin, a first contact socket, a second contact pin, a second contact socket, an alignment pin, and an alignment socket of another device;
   a second housing;
   a second insert mounted in the second housing;
   a first fiber optic connector mounted in the second insert;

a second fiber optic connector mounted in the second insert;
a third contact pin mounted in the second insert;
a fourth contact pin mounted in the second insert;
a fifth contact pin mounted in the second insert;
an sixth contact pin mounted in the second insert;
a cover attached to the second housing, and the cover having a third key;
a first optical fiber attached to the first ferrule and the first fiber optic connector so that the first ferrule is in optical communication with the first fiber optic connector;
a second optical fiber attached to the second ferrule and the second fiber optic connector so that the second ferrule is in optical communication with the second fiber optic connector;
a first conductor attached to the first contact pin and the third contact pin so that the first contact pin is in electrical communication with the third contact pin;
a second conductor attached to the first contact socket and the fourth contact pin so that the first contact socket is in electrical communication with the fourth contact pin;
a third conductor attached to the second contact pin and the fifth contact pin so that the second contact pin is in electrical communication with the fifth contact pin; and
a fourth conductor attached to the second contact socket and the sixth contact pin so that the second contact socket is in electrical communication with the sixth contact pin.

6. A device according to claim 5 wherein the first housing is attached to the second housing, and further comprising a bulkhead plate attached to one of the first housing and the second housing.

7. A device according to claim 6 wherein the first fiber optic connector conforms to the LC standard, and the second fiber optic connector conforms to the LC standard.

8. A device according to claim 7 wherein the cover is a male cover.

9. A device according to claim 5 wherein the first fiber optic connector conforms to the LC standard, and the second fiber optic connector conforms to the LC standard.

10. A device according to claim 9 wherein the cover is a male cover.

11. A device according to claim 10 wherein the first key has a first end and a second end, and the second key has a third end and fourth end, and the first end of the first key is separated from the third end of the second key by approximately seventy-five degrees, and the second end of the second key is separated from the fourth end of the second key by approximately one-hundred-six degrees.

12. A device according to claim 11 wherein the alignment pin and the alignment socket lie on a first line, and a second line intersects the first line at ninety degrees, and the second line is equal distant from both the alignment pin and the alignment socket, the first contact pin separated from the first line by approximately fifty-five degrees, the first contact socket separated from the first line by approximately fifty-five degrees, the second contact pin separated from the first line by approximately ten, the second contact socket separated from the first line by approximately ten degree, the first ball lens separated from the second line by approximately thirty degrees, and the second ball lens separated from the second line by approximately thirty degrees.

13. A device according to claim 12 wherein the alignment pin is approximately five millimeters away from an intersection of the fist line and the second line, the alignment socket is approximately five millimeters away from the intersection, the first ball lens is approximately five millimeters away from the intersection, the second ball lens is approximately five millimeters away from the intersection, the first contact pin is approximately five millimeters away from the intersection, the first contact socket is approximately five millimeters away from the intersection, the second contact pin is approximately two and one-tenth millimeters away from the intersection, and the second contact socket is approximately two and one tenth millimeters away from the intersection.

14. A device comprising:
a first housing;
a first insert mounted in the first housing;
a first fiber optic connector mounted in the first insert;
a second fiber optic connector mounted in the first insert;
a first contact pin mounted in the first insert;
a second contact pin mounted in the first insert;
a third contact pin mounted in the first insert;
a fourth contact pin mounted in the first insert;
a first cover attached to the first housing, and the first cover having a first key, and wherein the first cover is a male cover;
a second housing;
a second insert mounted in the second housing;
a third fiber optic connector mounted in the second insert;
a fourth fiber optic connector mounted in the second insert;
a fifth contact pin mounted in the second insert;
a sixth contact pin mounted in the second insert;
a seventh contact pin mounted in the second insert;
an eighth contact pin mounted in the second insert;
a second cover attached to the second housing, and the second cover having a second key, and wherein the second cover is a male cover;
a first optical fiber attached to the first fiber optic connector and the third fiber optic connector so that the first fiber optic connector is in optical communication with the third fiber optic connector;
a second optical fiber attached to the second fiber optic connector and the fourth fiber optic connector so that the second fiber optic connector is in optical communication with the fourth fiber optic connector;
a first conductor attached to the first contact pin and the fifth contact pin so that the first contact pin is in electrical communication with the fifth contact pin;
a second conductor attached to the second contact pin and the sixth contact pin so that the second contact pin is in electrical communication with the sixth contact pin;
a third conductor attached to the third contact pin and the seventh contact pin so that the third contact pin is in electrical communication with the seventh contact pin; and
a fourth conductor attached to the fourth contact pin and the eighth contact pin so that the fourth contact pin is in electrical communication with the eighth contact pin.

\* \* \* \* \*